Figure 1:
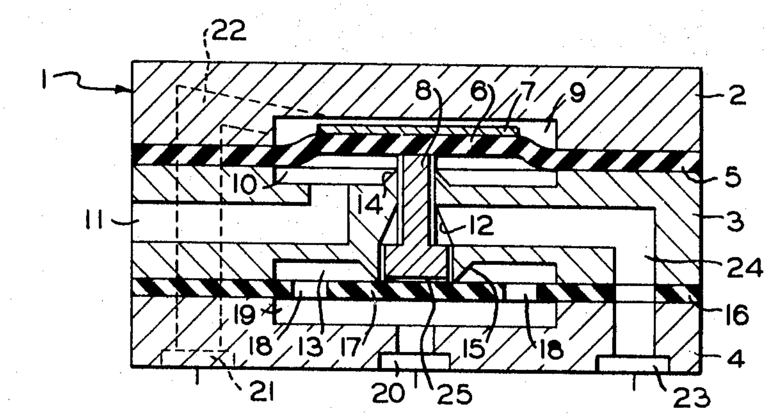

United States Patent

Coiner

[15] 3,653,408

[45] Apr. 4, 1972

[54] DIAPHRAGM OPERATED LOGIC VALVES

[72] Inventor: Ronald W. Coiner, Irwin, Pa.

[73] Assignee: Westinghouse Air Brake Company, Wilmerding, Pa.

[22] Filed: Nov. 24, 1969

[21] Appl. No.: 879,118

[52] U.S. Cl. ............................137/625.6, 251/28, 251/61.1, 235/201

[51] Int. Cl. ........................................................F16k 31/385

[58] Field of Search ....................251/61.1 X, 61.2, 331, 367, 251/28; 137/625.66, 625.27, 625.5, 102, 608, 271, 625.6, 625.61, 625.62, 625.63, 625.65; 235/200, 201 ME

[56] References Cited

UNITED STATES PATENTS

| | | | |
|---|---|---|---|
| 2,715,418 | 8/1955 | Van Derbeck | 251/61.1 X |
| 2,842,400 | 7/1958 | Booth et al. | 251/331 X |
| 3,042,072 | 7/1962 | Humphrey et al. | 137/625.27 X |
| 3,076,477 | 2/1963 | Brandenberg | 137/625.6 |
| 3,463,442 | 8/1969 | Leskiewicz et al. | 137/625.66 X |
| 3,470,910 | 10/1969 | Loveless | 137/625.6 |

*Primary Examiner*—M. Gary Nelson
*Assistant Examiner*—Robert J. Miller
*Attorney*—Ralph W. McIntire, Jr.

[57] ABSTRACT

A diaphragm operated fluid logic valve device utilizing proportionate pressure areas on opposite sides of the diaphragms for obtaining differential pressures thereacross and, therefore, snap action during transition from one state to another, said valve device structurally including interface characteristics so as to be adaptable to a wide range of pressures and, therefore, directly applicable in a high pressure system without the use of a separate interface device, and being capable of integration with a variety of means, such as a low pressure fluidic signal, a small solenoid, or a Belleville spring to provide an interface function for piloting the control pressure functions of the valve device.

2 Claims, 6 Drawing Figures

Patented April 4, 1972 3,653,408

2 Sheets-Sheet 1

INVENTOR.
RONALD W. COINER

BY *Ralph W. McIntire, Jr.*

ATTORNEY

*INVENTOR.*
RONALD W. COINER
BY Ralph W. McIntire, Jr.
ATTORNEY

DIAPHRAGM OPERATED LOGIC VALVES

BACKGROUND OF INVENTION

The use of low pressure fluidic logic devices, when used for controlling a high pressure system, normally requires the use of separate interface valve devices for delivering to the output of the logic device the high pressures required by the system. Many of the interface valve devices have sliding seals, which become worn and dirty, and consequently unreliable, and are of the stand-by fluid pressure type in which fluid pressure is constantly vented to atmosphere until a control signal is received for actuating the device, which results in a high, wasteful consumption of fluid pressure.

SUMMARY OF INVENTION

The object of the present invention, therefore, is to provide diaphragm operated fluid logic valve devices adaptable to a wide range of pressure so as to be suitable for use as an interface valve device, where required, or for use in a high pressure system without the additional need of a separate interface valve.

The logic valve devices herein disclosed and embodying the invention are of the diaphragm operated type in which pressure differential across the diaphragm is utilized in providing snap action, resulting in no hesitancy or signal pressure loss during transition, said logic valve devices also being adaptable to use as an interface valve. By using a modified cover section accommodating a pressure feedback sensing arrangement which, in turn, can be controlled by a low pressure fluidic element, a small solenoid, or a Belleville spring, the logic valve device may thus be employed as an interface device between a high pressure system and a low power system of fluid or electronic medium, or may be used as an on-off valve responsive to control pressure limits of a predetermined range.

The drawings, FIGS. 1 through 6 are elevational views, in section, of respective fluid logic valve devices embodying the invention.

DESCRIPTION AND OPERATION

FIG. 1 of the drawings shows a fluid logic valve device 1 known as an IDENTITY valve device, wherein the valve device is characterized by a single control pressure input and is operable to provide fluid pressure at an output only when the control input is pressurized.

The logic valve device 1 comprises a sectionalized housing having an upper section 2, an intermediate section 3, and a bottom section 4, all being of identical outer peripheral form.

An upper resilient diaphragm valve member 5, having its outer peripheral portion clamped between the upper and intermediate housing sections 2 and 3, by suitable means, not shown, to form a seal therebetween, has an inner central portion 6 which serves as a movable abutment and valve element. The central portion 6 of diaphragm valve member 5 is concentrically clamped between a follower 7 and a stem or valve operator 8. The diaphragm valve member 5 also separates a control pressure chamber 9 formed adjacent the lower face in upper housing section 2 from an atmospheric pressure chamber 10 formed adjacent the upper face in intermediate housing section 3. Atmospheric chamber 10 communicates with atmosphere via a passageway 11 formed in intermediate housing section 3.

Intermediate housing section 3 also has formed therein a bore 12 extending coaxially therethrough with the upper end thereof opening into atmospheric chamber 10 and the lower end opening into a delivery pressure chamber 13 formed adjacent the lower face in intermediate housing section 3. The upper end and the lower end of bore 12 are each encircled by an exhaust valve seat 14 and a supply valve seat 15, respectively, said exhaust valve seat being of smaller diameter then said supply valve seat. The upper and lower end portions of the valve operator 8 are of smaller and larger diameters, respectively, are fluted to permit flow of fluid pressure therepast, and are slidingly accommodated in an upper smaller-diameter portion and a lower larger-diameter portion, respectively, of bore 12 for guiding said valve operator during reciprocal axial movement thereof.

A lower resilient diaphragm valve member 16 having its outer peripheral portion clamped between the intermediate housing section 3 and the lower housing section 4, by suitable means, not shown, to form a seal therebetween, has an inner central portion 17 which serves as a movable abutment and a valve element. The central diaphragm portion 17 has a plurality of equiangularly spaced apertures 18 extending axially therethrough at equiradial distances from the diaphragm axis. The diaphragm valve member 16 separates delivery pressure chamber 13 from a supply pressure chamber 19 formed adjacent the upper face in lower housing section 4, said supply pressure chamber being connected to a fluid pressure supply port or inlet 20 formed in lower housing section 4.

Control pressure chamber 9 is connected to a fluid pressure control port 21 in lower housing section 4 via a passageway 22 comprising cooperatively registering segments formed in housing sections 2, 3, and 4. The bore 12 is communicated to a fluid pressure delivery port or outlet 23 in lower housing section 4 via a passageway 24 comprising cooperatively registering segments formed in housing sections 3 and 4.

In considering the operation of the IDENTITY valve device shown in FIG. 1, it will be assumed that supply pressure is applied at the inlet 20 and that no control pressure is present at control port 21. Under these conditions, that is, with control chamber 9 depressurized, the valve operator 8 assumes an upper limit position, as shown, in which the central diaphragm portion 17 is seated against valve seat 15. Because a certain portion of the upper side or pressure area of the central portion 17 is enclosed by valve seat 15 and therefore, cut off from supply fluid pressure, said central diaphragm portion is maintained in its seated position by pressure differential thus established between the two sides, such differential pressure being equivalent to the pressure acting on an area corresponding to said area enclosed by said valve seat. Supply fluid pressure is thereby cut off from outlet 23.

If control passageway 22 is pressurized, such pressure in control chamber 9 and therefore acting on central portion 6 of upper diaphragm valve member 5, when increased to a level sufficient for overcoming the opposing pressure differential acting across lower diaphragm portion 17, is effective for moving the valve operator 8 downwardly to cause said lower diaphragm portion 17 to be unseated from valve seat 15. The upper area of diaphragm portion 6 is much larger than the area of diaphragm portion 17 enclosed by the valve seat 15. Thus, a relatively low pressure acting on the upper diaphragm portion 6 is sufficient for overcoming the opposing effect of higher supply pressure acting on the smaller area equivalent to that within the valve seat 15. The lower surface of valve operator 8 has a plurality of V-shaped, side-by-side grooves 25 formed thereon, so that upon initial unseating of the lower diaphragm portion 17 from valve seat 15, substantially all of the upper surface of said lower diaphragm portion is immediately exposed to supply fluid pressure prevailing in delivery chamber 13, thereby equalizing the pressure effects on opposite sides of said lower diaphragm portion. Consequently, the relatively low fluid pressure in control chamber 9 acting on upper central portion 6 is rendered effective for moving the valve operator 8 downwardly with a snap action to a lower limit position in which the upper central diaphragm portion 6 is seated on valve seat 14 to cut off communication of bore 12 with atmosphere, and fluid pressure from delivery chamber 13 is supplied to outlet 23 via the space between said valve operator and bore 12 and via passageway 24.

To cut off supply of fluid pressure to the outlet 23, control pressure in control passageway 22 and control chamber 9 must be reduced. Since, as it will be recalled, valve seat 14 is smaller and, therefore, encompasses a lesser pressure area than valve seat 15, it follows that any degree of control pressure acting on upper diaphragm portion 6 sufficient for overcoming the opposing effect of supply pressure acting over an area equivalent to that encompassed by valve seat 15 (and thereby operating the valve operator 8 to its lower limit position) is also sufficient for maintaining said upper diaphragm portion seated on valve seat 14. The upper diaphragm portion 6 will thus be retained in its seated position on valve seat 14 until such control pressure acting on the upper side of said upper diaphragm portion is reduced sufficiently to render the supply pressure acting on the underside thereof on the area enclosed within said valve seat effective for initiating unseating of said upper diaphragm portion from the valve seat. Immediately upon initial unseating of upper diaphragm portion 6, the entire underside thereof is then exposed to fluid pressure in bore 12, thereby, producing upward movement, with a snap action, of said diaphragm portion and the valve operator 8 to its upper limit position in which lower diaphragm portion 17 is again seated on valve seat 15 to terminate further flow of fluid pressure to outlet 23, and said outlet is again communicated to atmosphere via passageway 24, bore 12, atmospheric chamber 10, and passageway 11.

It should be readily apparent that the logic valve device 1 may also function as an AND device, that is, a device which provides a delivery pressure only when both of two control inputs are pressurized simultaneously. For this purpose inlet 20 and port 21 are considered as control pressure inputs, with outlet 23 as the delivery port and passageway 11 as the exhaust.

If neither inlet 20 nor port 21 is pressurized, no delivery occurs at outlet 23. If control port 21 only is pressurized, the pressure in control chamber 9 moves operator 8 downwardly, as above described, to seat diaphragm portion 6 on valve seat 14 and to unseat diaphragm portion 17 from valve seat 15. Since inlet 20, however, is not pressurized, no pressure delivery occurs at outlet 23. Conversely, if inlet 20 only is pressurized, such pressure serves to move operator 8 upwardly to seat diaphragm portion 17 on valve seat 15 and to unseat diaphragm portion 6 from valve seat 14, hence no pressure delivery at outlet 23.

If both port 21 and inlet 20 are pressurized simultaneously, pressure in control chamber 9 acting on diaphragm portion 6 causes valve operator 8 to be moved to its lower limit position in which diaphragm portion 6 is seated on valve seat 14 and diaphragm portion 17 is unseated from valve seat 15 whereby fluid pressure may flow from inlet 20 to outlet 23, as above described.

Figure 2:
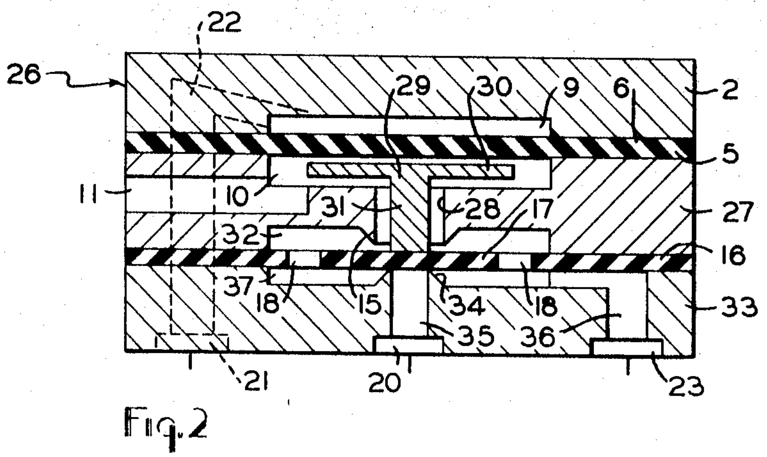

The logic valve device shown in FIG. 2 is a single input NOR valve 26, also referred to as a NOT valve device, wherein the valve device is characterized by a single control pressure input and is operable to provide fluid pressure at the output only when the control input is depressurized.

In the NOT valve device 26, the upper housing section 2, the upper diaphragm valve member 5, and lower diaphragm valve member 16 are substantially identical in structure, relative disposition and function to those of valve device 1, and accordingly, for purposes of simplicity, have been assigned identical reference numerals.

An intermediate housing section 27 is similar to intermediate housing section 3 of valve device 1 except that a coaxial bore 28 extending therethrough is of uniform diameter and there is no valve seat formed at the upper end thereof opening into the atmospheric chamber 10. A valve operator 29 coaxially disposed in housing section 27 for reciprocable movement has a flange portion 30 at the upper end thereof with which the upper diaphragm portion 6, when moving downwardly, makes abutting contact, and a coaxial stem portion 31 extending through the bore 28, with radial clearance, for making abutting contact with the lower diaphragm portion 17. Delivery chamber 13 in the valve device 1 becomes an exhaust chamber 32 in the valve device 26.

A lower housing section 33 is similar to lower housing section 4 of FIG. 1 except that a valve seat 34 disposed in oppositely facing relation to the valve seat 15 encircles the upper end of a supply passageway 35 axially aligned with bore 28 and connected to inlet 20. Valve seat 34 is smaller than valve seat 15 for a purpose similar to that discussed above in connection with valve seats 14 and 15 of the valve device 1. The outlet 23 is connected via a passageway 36 to a delivery chamber 37.

In operation of the NOT valve device 26, assuming that no control pressure is present in control passageway 22 and control chamber 9, and that supply pressure is present at inlet 20, such supply pressure unseats lower diaphragm portion 17 which, once unseated, has its entire lower pressure area exposed to said supply pressure and, therefore, in well known manner is moved upwardly with a snap action to a seated position on valve seat 15. Outlet 23 is thus cut off from exhaust chamber 22 and atmosphere, and is provided with supply pressure from inlet 20, while at the same time, valve operator 29 is moved into contact with upper diaphragm portion 6.

If control passageway 22 and, therefore, control chamber 9 are pressurized to a degree sufficient for overcoming supply pressure acting on the underside of lower diaphragm portion 17 over an area equivalent to that enclosed by the valve seat 15 on the upper side of said diaphragm portion, said lower diaphragm portion moves downwardly with a snap action, as described above in connection with valve device 1, to cut off further supply of pressure to outlet 23. As was the case with valve device 1, above described, the degree of control pressure relative to that of supply pressure may be considerably less due to the comparison of the area enclosed within the valve seat 15 as related to that of upper diaphragm portion 6 subjectable to control pressure. As long as control pressure prevails in control chamber 9 and acts on upper diaphragm portion 6, the valve operator 29 is retained in a lower limit position in which lower diaphragm portion 17 is held in its seated position on valve seat 34. In the meantime, outlet 23 is vented to atmosphere via passageway 36, delivery chamber 37, apertures 18, exhaust chamber 32, bore 28, atmospheric chamber 10, and passageway 11.

If the control pressure in control passageway 22 and control chamber 9 is reduced sufficiently to render supply pressure acting over the area of diaphragm portion 17 encompassed within the valve seat 34 effective for unseating said diaphragm portion, the diaphragm portion and the valve operator 29 are moved upwardly with a snap action, as above described, to the upper limit position to reestablish communication between supply inlet 20 and delivery outlet 23.

Figure 3:
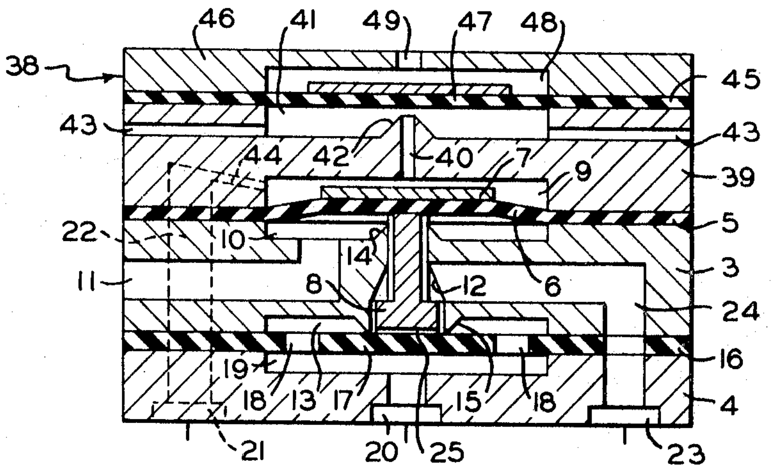

A modified logic valve device 38 shown in FIG. 3 can function either as an AND device characterized by a plurality of control pressure inputs and is operable to provide fluid pressure at the output only when all the control pressure inputs are pressurized, or as an IDENTITY device, above defined. Because of its nature and as will become evident from the following description thereof, the valve device 38 may be used as an interface valve between a fluidic pressure system and a high pressure system.

With certain exceptions, as hereinafter noted, the valve device 38 has certain components similar to valve device 1 shown in FIG. 1 and, therefore, for purposes of expediency like elements have been designated with identical reference numerals as those used in describing valve device 1.

The valve device 38 further comprises an upper housing section 39 differing from upper housing section 2 of the valve device 1 in that a bleeder port 40, axially aligned with bore 12, extends through an intermediate wall separating the control chamber 9 from an exhaust chamber 41, said bleeder port having a valve seat 42 formed on the upper end thereof opening into said exhaust chamber. The exhaust chamber 41 is open to atmosphere via exhaust ports 43 formed in housing section 39. For a purpose hereinafter disclosed, passageway 22 has a choke 44 formed therein leading into control chamber 9.

The outer peripheral portion of an uppermost resilient diaphragm valve member 45 is clamped, by suitable means, not shown, between upper housing section 39 and a cover member 46 to form a seal therebetween. A central portion 47 of the diaphragm valve member 45 serves as a valve element, for a purpose to be hereinafter set forth, and also separates the exhaust chamber 41 from a low pressure chamber 48 formed in the cover member 46. A port 49 opening to low pressure chamber 48 is provided in the cover member 46 to permit admission of a low pressure control signal such as from a fluidic device, for example.

The valve device 38, similar to the valve device 1 shown in FIG. 1, functions to deliver fluid pressure to the outlet 23 only when control chamber 9 is pressurized to act on diaphragm portion 6 for moving the valve operator 8 to its lower limit position, as above described. Pressure in control chamber 9, however, builds up only at a rate determined by choke 44, and unless bleeder port 40 is closed by diaphragm portion 47, such control pressure bleeds away to atmosphere via said bleeder port, exhaust chamber 41 and exhaust ports 44 and, therefore, is ineffective for causing diaphragm portion 6 to operate valve operator 8 to its lower limit position. A low pressure signal admitted to low pressure chamber 48 through port 49, however, is effective for causing diaphragm portion 47 to move to a seated position on valve seat 42. Due to the much larger area on the upper side of diaphragm portion 47 over which the low pressure acts, as compared to the small area on the underside encompassed by the valve seat 42 and over which control pressure in chamber 9 acts, it is obvious that a very low pressure, such as provided by a fluidic device, is sufficient to maintain said diaphragm portion in its seated position on said valve seat.

Assuming that control pressure for control chamber 9 is provided from a common source, not shown, from which inlet 20 is also supplied, so that said control chamber and said inlet are constantly charged. In this instance valve device 38 functions as an IDENTITY device. In order to effect pressure build-up in control chamber 9 to a degree sufficient for operating diaphragm valve member 5 and valve operator 8 downwardly, bleed port 40 must be closed. Bleed port 40 is closed when a fluidic pressure signal is received in low pressure chamber 48 through port 49. With bleeder port 40 closed, valve device 38 functions in a fashion similar to that described above in connection with valve device 1 in causing downward movement of valve operator 8 and unseating of diaphragm valve 16 to effect an output at outlet 23. Release of fluidic pressure in low pressure chamber 48 allows control pressure in bleeder port 40 to unseat diaphragm portion 47 and, therefore, escape to atmosphere, whereby, as above described, valve operator 8 assumes its upper limit position. Thus, in accordance with the definition, above set forth, of an IDENTITY valve device, each time the control port 49 is pressurized, output is effected at the outlet 23.

If, however, the control signal for pressurizing control port 21 (and therefore control chamber 9) is supplied from a different source, not shown, than that from which inlet port 20 is supplied, then valve device 38 functions as an AND device because both control port 21 (and therefore control chamber 9) and port 49 (and therefore low pressure chamber 48) must be pressurized to produce an output at outlet 23, as above described.

From the above description of valve device 38, it should be apparent that the modifications embodied therein may be applied to both the valve devices 1 and 26 shown in FIGS. 1 and 2, respectively, by substituting upper housing section 39 and cover member 46, with diaphragm valve member 45 clamped therebetween, for upper housing section 2 in both the devices 1 and 26. Thus modified, valve device 1 would be an AND device identical in structure and function to valve device 38 shown in FIG. 3, and valve device 26 would be a NAND device. A NAND device is characterized by a plurality of control pressure inputs all of which must be pressurized to cut off supply at the outlet. Thus, with valve device 26 modified as above suggested, both the control port 21 and low pressure port 49 must be pressurized to effect seating of diaphragm valve member 16 on valve seat 34 to cut off output at outlet 23.

Figure 4:
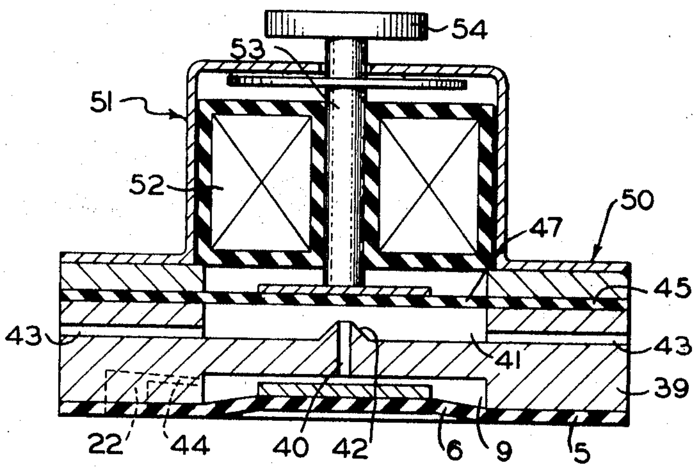

FIG. 4 of the drawings shows a solenoid operated logic valve device 50 which may be used as in interface valve between a low power electric medium and a high pressure fluid medium.

The valve device 50, as shown, is an AND device (above defined) similar to the valve device 38 shown in FIG. 3, except that the low level fluidic control pressure provided at port 49 in the device 38 is replaced by a low level force generated by a low current solenoid device 51 for controlling opening and closing of the bleeder port 40. Energization of a coil 52 of the solenoid 51 causes a stem or plunger 53, axially aligned with bleeder port 40 and making abutting contact with diaphragm portion 47, to move downwardly to thereby seat the diaphragm portion on the valve seat 42, and deenergization of said coil renders control pressure in said bleeder port effective for moving said diaphragm portion, along with said stem, upwardly to its unseated position. Otherwise, the remainder of the valve device 50 functions similarly to the valve device 38, above described.

The end of plunger 53 opposite the end contacting diaphragm portion 47, that is, the exterior end of said plunger is provided with button or flange 54 by which said plunger may be manually retracted, if necessary.

The modifications illustrated by the valve device 50, that is, the housing section 39 and the solenoid device 51, with the diaphragm valve member 45 clamped therebetween, are also applicable to both the valve devices 1 and 26 by substituting such modifying components for housing section 2 in the devices 1 and 26. By such modifications, the valve devices 1 and 26 are converted to AND and NAND devices, respectively, similarly as when modified according to the modifications shown in FIG. 3. The manner of function should be evident from the preceding description.

Figure 5:
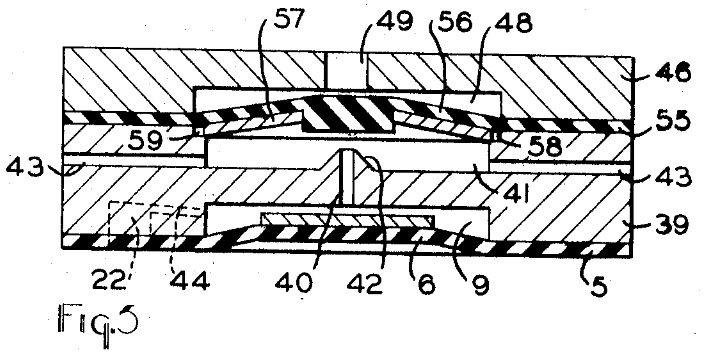

The device shown in FIG. 5 is essentially the device illustrated in FIG. 3 in further modified form which, as shown, is an AND device also, the difference being that a resilient diaphragm valve member 55, having a central portion 56 and clamped between the upper housing portion 39 and the cover member 46 in similar fashion as the diaphragm members in the other devices above described, as a Belleville type spring 57 bonded to said central portion. The Belleville spring 57 is disposed in exhaust chamber 41 with its outer periphery lodged in an annular groove 58 formed by diaphragm valve member 55 and a shoulder 59 in the upper face of housing portion 39. Sufficient clearance is provided between the outer periphery of the Belleville spring 57 and the vertical wall of groove 58 to allow for radial expansion of the spring when the center thereof is moved with a snap action from one axial position to the other. The Belleville spring 57, therefore, serves to impart a snap action to the diaphragm portion 56 when either moving downwardly to seat on valve seat 42 or moving upwardly to an unseated position.

By providing the Belleville spring 57 with a hysteretic value compatible with the degree of fluid pressure admitted to chamber 48 via port 49 for operating the diaphragm portion 56, such pressure thus used may range from a low fluidic pressure to a normal control pressure, so that the logic valve device thus obtainable is adaptable to a wide range of pressure conditions.

The modifications embodied in the device shown in FIG. 5 are applicable to valve devices 1 and 26 in a manner similar to that mentioned in connection with applying the modifications embodied in the valve device 38 shown in FIG. 3. Again the valve devices, by such modifications, would be converted to AND and NAND devices, respectively.

Figure 6:
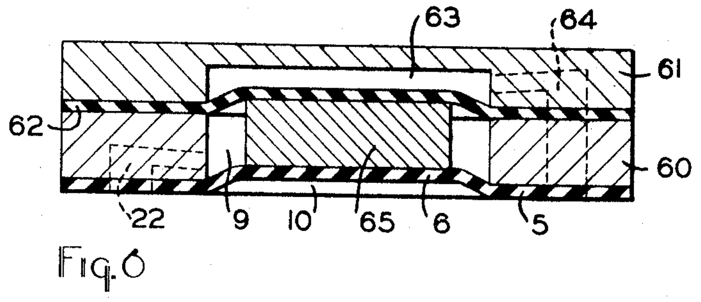

FIG. 6 illustrates a further modification comprising an upper housing portion 60, intended to replace housing portions 2 in valve devices shown in FIGS. 1 and 2 and to replace housing portion 39 and the cover members 46 in the valve devices shown in FIGS. 3 and 5. The modification further includes a cover member 61 to be used with the upper housing portion 60, an additional diaphragm member 62 (clamped in the usual manner between the housing section 60 and the cover member 61), said cover member and said diaphragm member cooperating to form an additional control chamber 63, and a passageway 64 leading to said control chamber. With the additional diaphragm 62, control chamber 63, and passageway 64, it is possible to control the logic valve device in conventional manner, but control fluid pressure may be supplied from alternative sources. A rigid spacer 65 is disposed in control chamber 9 in concentric relation to and between diaphragm valve member 5 and diaphragm member 62, said spacer being secured to one or the other of said diaphragm member for retaining the spacer in said concentric relation. The spacer 65 serves to transmit motion from diaphragm member 62 when control chamber 63 is pressurized and consequently cause downward movement of valve operator 8 (in valve device 1) or valve operator 29 (in valve device 26). Since spacer 65 is secured to only one of the diaphragm members 5 and 62, the two diaphragm members are free to move independently of each other when control chamber 9 is pressurized, which also causes downward movement of either of the valve operators 8 or 29, depending upon which of the valve devices 1 or 26 is employed. It should be apparent that if both control chambers 9 and 63 are pressurized simultaneously, the results are similar to those obtained when only one or the other of said control chambers is pressurized.

By applying the modification shown in FIG. 6 to valve device 1 shown in FIG. 1, that is, by substituting housing section 60 and cover member 61, with diaphragm 62 clamped therebetween, for housing section 2 of valve device 1, said valve device may thereby be converted to an OR device characterized by a plurality of control inputs, 22 and 64 in this instance, whereby pressurization of anyone or combination of said inputs effects an output at outlet 23.

If the modifications shown in FIG. 6 are applied to valve device 26 by substituting for housing section 2 in said valve device, said valve device may thereby be converted to a NOR device characterized by a plurality of control inputs, which must all be void of pressure to effect an output at outlet 23. Presence of pressure in anyone or combination of the inputs, 22 and 64, effects a cut-off of output at outlet 23.

Having now described the invention, what I claim as new and desire to secure by Letters Patent, is:

1. A diaphragm operated logic valve device comprising:

a. a housing having a first control pressure chamber, a second control pressure chamber adjacent said first control pressure chamber, and an atmospheric pressure chamber therein;

b. a fluid pressure inlet in said housing to which fluid pressure may be supplied;

c. a fluid pressure outlet in said housing from which fluid pressure may be delivered;

d. a first resilient diaphragm valve member separating said first control pressure chamber from said atmospheric pressure chamber and controlling communication between said fluid pressure outlet and said atmospheric pressure chamber;

e. a second resilient diaphragm valve member controlling communication between said fluid pressure inlet and said fluid pressure outlet;

f. a valve operator reciprocably disposed in a bore formed coaxially in said housing and providing radial space between the bore and the valve operator, said valve operator being operable from a first position, in which said first diaphragm valve member cuts off communication between said outlet and said atmospheric chamber and said second diaphragm valve member effects communication between said inlet and said outlet, to a second position in which said second diaphragm valve member cuts off communication between said inlet and said outlet and said first diaphragm valve member effects communication between said outlet and said atmospheric pressure chamber via said radial space, g. said valve operator normally assuming one of said first and second positions and having abutting contact at one end with said first diaphragm valve member and at the other end with said second diaphragm valve member, said second diaphragm valve member being subjectable to fluid pressure in said inlet for biasing said valve operator and said first diaphragm valve member in a direction opposing pressure in said control pressure chamber, and said valve operator being operable to the other of said first and second positions in response to pressure in said control pressure chamber acting on said first diaphragm valve member at a certain degree sufficient for overcoming the bias of said inlet pressure acting on said second diaphragm valve member;

h. a third diaphragm member separating said first control pressure chamber from said second control pressure chamber; and i. a rigid connecting member disposed in said first control pressure chamber and making abutting contact with said first diaphragm valve member and said third diaphragm member for transmitting movement from one to the other in response to pressurization of one or the other of said control chambers.

2. A diaphragm operated logic valve device comprising:

a. a housing having formed therein:

i. a control pressure chamber, ii. an atmospheric pressure chamber, iii. an exhaust chamber open to atmosphere, iv. a low pressure chamber having a port via which fluid pressure may be admitted thereinto, v. a coaxially disposed bore, vi. passage means for communicating said control chamber with said exhaust chamber for normally venting said control chamber to atmosphere via the exhaust chamber, vii. a fluid pressure inlet to which fluid pressure may be supplied, viii. a fluid pressure outlet from which fluid pressure may be delivered;

b. valve seat means disposed in said exhaust chamber in surrounding relation to the end of said passage means adjacent the exhaust chamber;

c. a first resilient diaphragm valve member separating said control pressure chamber from said atmospheric chamber and for controlling communication between said fluid pressure outlet and said atmospheric chamber;

d. a second resilient diaphragm valve member controlling communication between said fluid pressure inlet and said fluid pressure outlet;

e. a valve operator reciprocably disposed in said bore with a radial space provided therebetween, said valve operator being operable from a first position, in which said first diaphragm valve member cuts off communication between said outlet and said atmospheric chamber and said second diaphragm valve member effects communication between said inlet and said outlet, to a second position in which said second diaphragm valve member cuts off communication between said inlet and said outlet and said first diaphragm valve member effects communication between said outlet and said atmospheric pressure chamber via said radial space, f. said valve operator normally assuming one of said first and second positions and having abutting contact at one end with said first diaphragm valve member and at the other end with said second diaphragm valve member, said second diaphragm valve member being subjectable to fluid pressure in said inlet for biasing said valve operator and said first diaphragm valve member in a direction opposing pressure in said control pressure chamber, and said valve operator being operable to the other of said first and second positions in response to pressure in said control pressure chamber acting on said first diaphragm valve member at a certain degree sufficient for overcoming the bias of said inlet pressure acting on said second diaphragm valve member;

g. a third diaphragm member separating said exhaust chamber from said low pressure chamber, said third diaphragm member being operable, in response to fluid pressure admitted to said low pressure chamber, to a seated position on said valve seat means for cutting off venting of said control pressure chamber to atmosphere via said exhaust chamber, and being operable to an unseated position relative to said valve seat means responsively to release of fluid pressure from the low pressure chamber concurrently with presence of fluid pressure in the control pressure chamber acting on the area of said third diaphragm member encompassed within said valve seat means; and h. a Belleville spring disposed in said exhaust chamber for biasing said third diaphragm member to its said unseated position, upon initial urging by said control chamber pressure acting on said area within said valve seat means subsequently to depressurization of the low pressure chamber, and being effective, in response to pressurization of said low pressure chamber at a degree sufficient for overriding the bias of the Belleville spring, for moving said third diaphragm member to its said seated position.

* * * * *

PO-1050
(5/69)

UNITED STATES PATENT OFFICE
CERTIFICATE OF CORRECTION

Patent No. 3,653,408 Dated April 4, 1972

Inventor(s) Ronald W. Coiner

It is certified that error appears in the above-identified patent and that said Letters Patent are hereby corrected as shown below:

Column 6, line 39, "as a Belleville" should be --has a Belleville--

Column 8, line 20, after "of", first occurrence, insert --said--; same line, erase "or the other"

Signed and sealed this 14th day of November 1972.

(SEAL)
Attest:

EDWARD M.FLETCHER,JR.
Attesting Officer

ROBERT GOTTSCHALK
Commissioner of Patents